: 3,056,022
AUTOMATIC CAR RETARDER CONTROL SYSTEM FOR RAILROADS

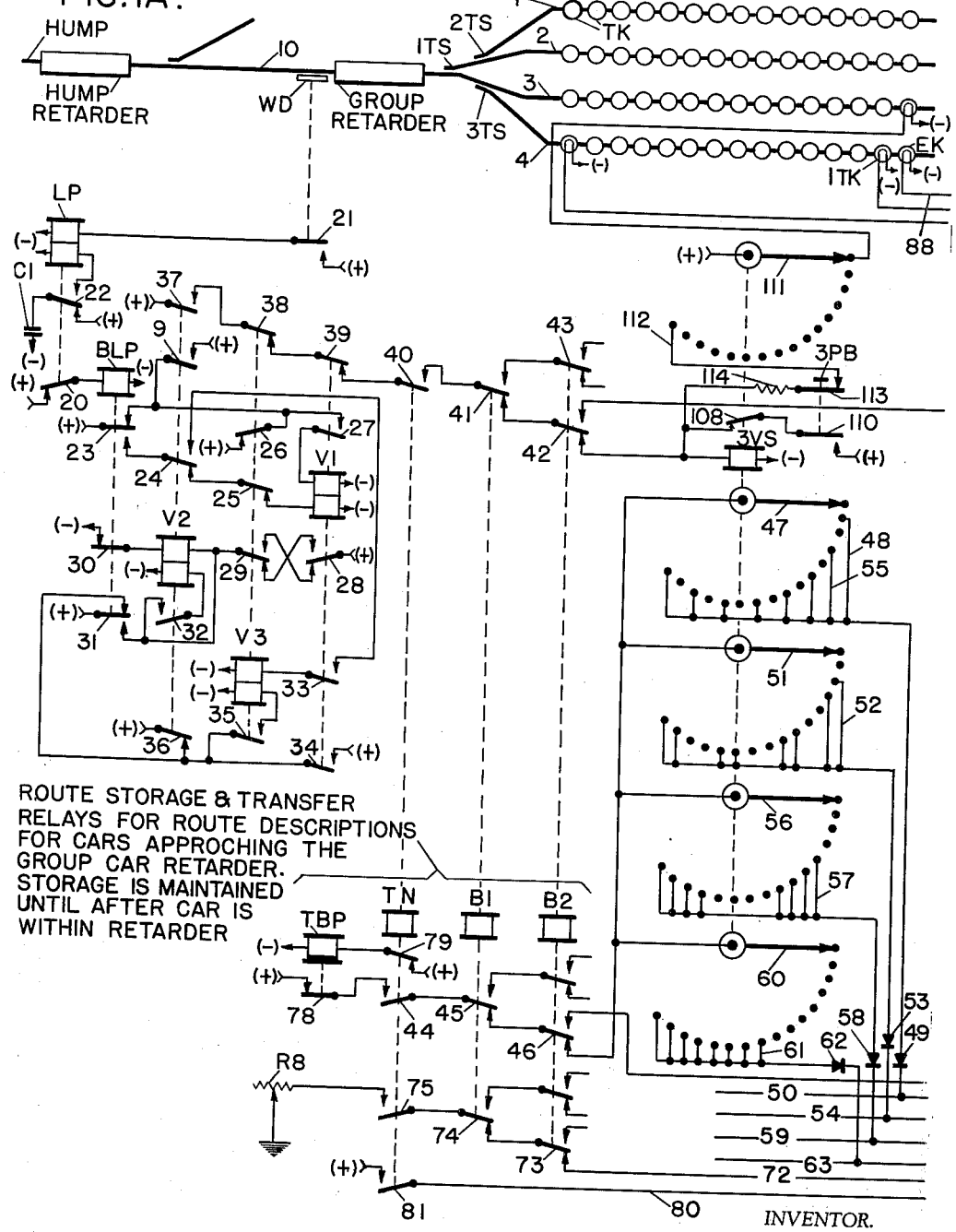
Sept. 25, 1962 — S. M. PHELPS — 3,056,022
AUTOMATIC CAR RETARDER CONTROL SYSTEM FOR RAILROADS
Filed March 29, 1957 — 3 Sheets-Sheet 1
FIG. IA.
ROUTE STORAGE & TRANSFER RELAYS FOR ROUTE DESCRIPTIONS FOR CARS APPROCHING THE GROUP CAR RETARDER. STORAGE IS MAINTAINED UNTIL AFTER CAR IS WITHIN RETARDER
INVENTOR.
S. M. PHELPS
BY
HIS ATTORNEY Sept. 25, 1962 S. M. PHELPS 3,056,022
AUTOMATIC CAR RETARDER CONTROL SYSTEM FOR RAILROADS
Filed March 29, 1957 3 Sheets-Sheet 2
FIG. IB.
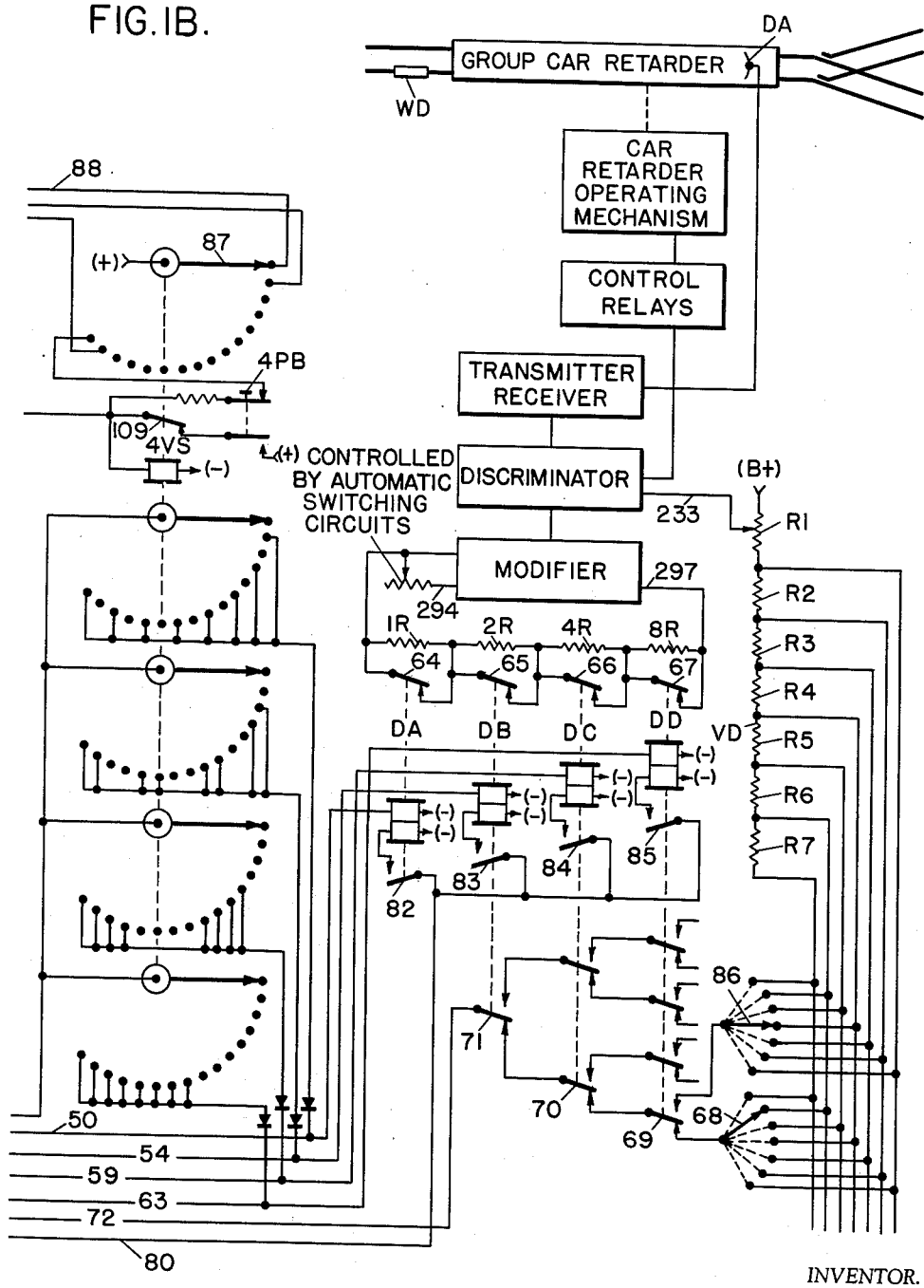
INVENTOR.
S.M. PHELPS
BY
Forest B. Hitchcock
HIS ATTORNEY Sept. 25, 1962 S. M. PHELPS 3,056,022
AUTOMATIC CAR RETARDER CONTROL SYSTEM FOR RAILROADS
Filed March 29, 1957 3 Sheets-Sheet 3
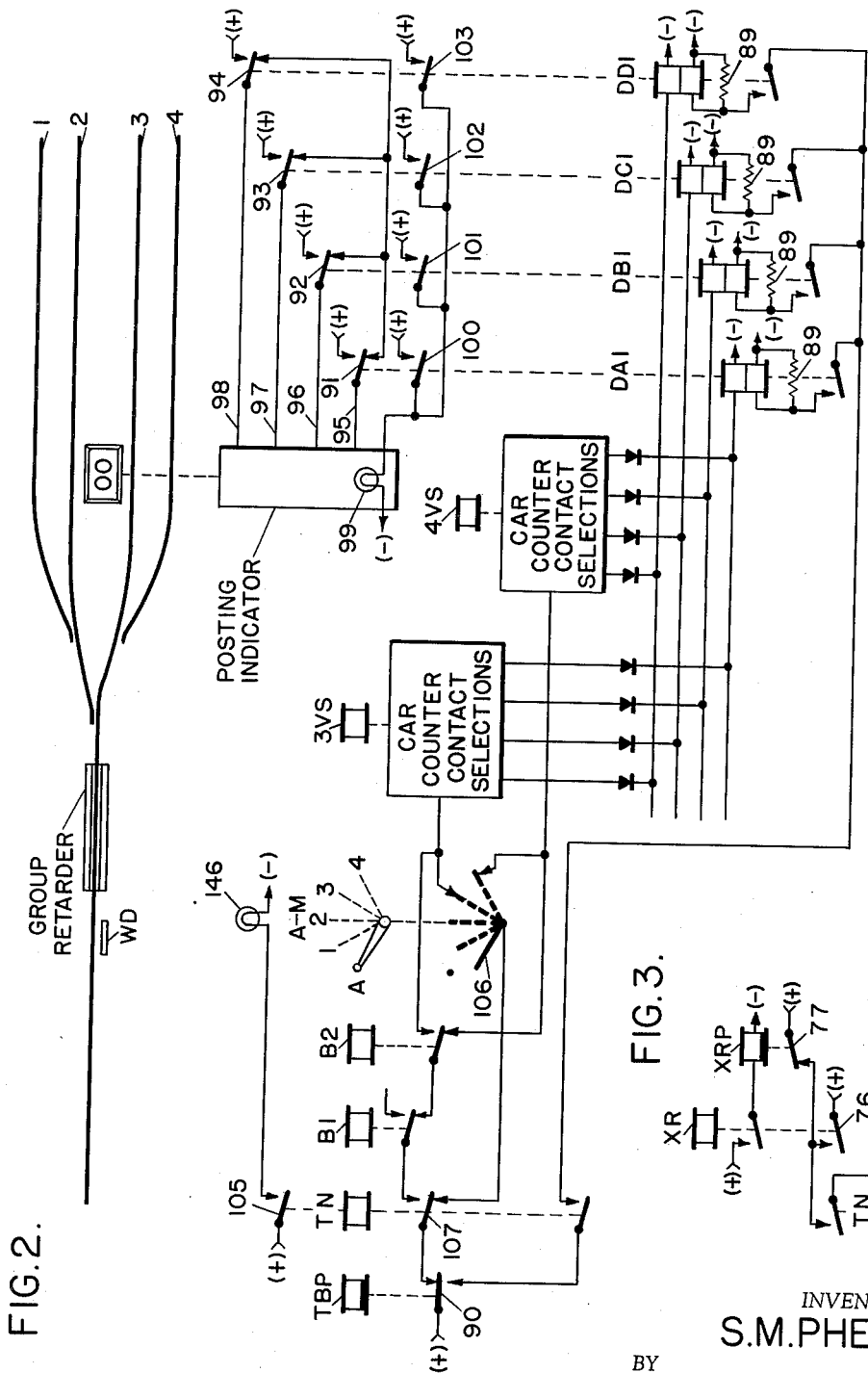
FIG.2.
FIG.3.
INVENTOR.
S.M.PHELPS
BY
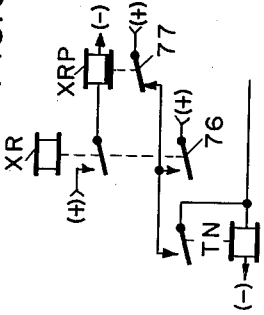
HIS ATTORNEY

Stuart M. Phelps, Rochester, N.Y., assignor to General Railway Signal Company, Rochester, N.Y.
Filed Mar. 29, 1957, Ser. No. 649,373
4 Claims. (Cl. 246—182)

This invention relates to the automatic control of track brakes such as are employed in railway classification yards, and it more particularly pertains to means for modifying the car speed at which a car retarder is opened in accordance with varying conditions.

The grade of a hump classification yard is such that the hardest rolling car will roll to the extreme end of any one of the classification tracks in a yard. For the other cars, retardation is applied by hump and group car retarders as required so that all cars, regardless of their different degrees of rollability, arrive at their destinations at proper coupling speeds. The hump car retarder is disposed in a single stretch of track near the hump that feeds to all areas of the yard, and the group car retarders are disposed in respective stretches of track feeding respective groups of several classification tracks. Thus each car may be acted upon first by the hump car retarder and lastly by a group car retarder, and the control of the group car retarder has to be such that the release speed of each car will be proper to cause the car to arrive at its destination at a low enough coupling speed to prevent damage to the car and lading. These car retarders are power operated, and although originally they were required to be controlled manually by an operator in a control tower, more recent systems of automatic car retarder control have been developed as is disclosed, for example, in the prior U.S. Patent application of J. H. Auer, Ser. No. 578,047, filed April 13, 1956, and in the prior U.S. Patent application of H. C. Kendall et al., Ser. No. 513,364, filed June 6, 1955.

Generally speaking, and without attempting to define the scope of the present invention, the present invention provides improvements over the systems disclosed in the above-mentioned patent applications by automatically modifying the car speed at which a car retarder is to be automatically released, both in accordance with the distance the car must travel in a classification track to a point of coupling with another car, and in accordance with the relative track elevation at the point of coupling in each classification track as compared to the track elevation at the group car retarder. Thus correction is made both for track fullness and for track elevation.

Track fullness is determined by a car counter for each of the classification tracks. Rather than each car counter being actuated by a car detecting device in connection with the associated classification track, a group of car counters is selectively actuated by a single car detecting device associated with a stretch of trackway common to the group of classification tracks involved.

This car detecting device is in the form of an axle counter that makes four counts to detect a car in accordance with the actuation of a weight detector or treadle generally located in approach to the group car retarder. The selection of a particular car counter to receive a detected car count is made by a bank of route storage relays that store the destination for the car. Thus when the axles of a car are counted approaching the group car retarder, a car count is fed into a car counter that is selected by a bank of storage relays identifying the particular class track that is to receive the car. By this mode of operation, only a single car detector, or axle counter, is required per group of car counters.

To facilitate reading out of the car counters for a particular group of classification tracks, the car counts as registered by the car counters are converted into a binary code in a relay bank common to the car counters for the entire group of classification tracks.

The binary relay bank in turn is effective to selectively modify selectively the release speed for electronic control apparatus acting upon the group car retarder mechanisms so as to vary selectively the release of the group car retarder for different speeds of respective cars within the car retarder in accordance with the degree of track fullness of the particular classification track which the respective cars will enter.

The binary code relay bank also is effective to cooperate with separate release speed modification means in accordance with track elevation, as track elevation also varies with respect to the several coupling points in accordance with track fullness.

Provision is made for indicating track fullness on a track diagram by indicator lamps for the respective car counts in each classification track, or by the use of a single binary posting indicator for each group of classification tracks. Such an indicator is selectively controlled to indicate track fullness for the track that has been selected to receive a car approaching or within the group car retarder for the associated group. It is further provided that an operator may cause the setting up in the posting indicator of the car count for any track by the operation of a manual track selector switch.

An object of the present invention is to detect each car entering a group car retarder and to record its count on a selected car counter for one of the classification tracks belonging to the group of classification tracks associated with the group car retarder.

Another object of the present invention is to select the car counter to receive a car count in accordance with the stored description of a destination for the car that is about to have its axles counted.

Another object of the present invention is to provide a binary code relay bank for reading a binary code corresponding to a car count storage out of any selected one of the car counters for the respective classification tracks of a group.

Another object of the present invention is to modify the car speed at which a group car retarder will be automatically opened in accordance with the condition of the relays of the binary code relay bank for the associated group of classification tracks.

Another object of the present invention is to modify the car speed at which a group car retarder will be automatically opened in accordance with track elevation as selected in accordance with track fullness.

Another object of the present invention is to selectively control a posting indicator to indicate track fullness of any one of a group of classification tracks.

Other objects, purposes, and characteristic features of the present invention will be in part obvious from the accompanying drawings, and in part pointed out as the description of the invention progresses.

In describing the invention in detail, reference is made to the accompanying drawings in which apparatus having similar functions is designated by like letter reference characters, and in which:

FIGS. 1A and 1B, when placed side by side, illustrate, as one embodiment of the present invention, apparatus for automatically controlling a group car retarder;

FIG. 2 illustrates a system for the posting of track fullness for a group of classification tracks; and FIG. 3 illustrates a stick circuit for maintaining a transfer relay energized until a car retarder has been vacated.

To simplify the illustrations and facilitate the explanation of the present invention, conventional circuit diagrams, block diagrams and symbols are employed, the drawings having been made particularly to facilitate an understanding of the principles and mode of operation of the present invention rather than to illustrate the specific construction and arrangement of parts that would be employed in practice. The various relays and their contacts are shown in a conventional manner and symbols are used to indicate connections to terminals of batteries and other sources of electric current instead of showing all of the wiring connections to these terminals. The symbols (+) and (−) are used to indicate connections to the positive and negative terminals respectively of a suitable source of direct current. The symbol (B+) is used to indicate connection to the positive terminal of a suitable power supply for the operation of electron tubes and the like.

A typical portion of a classification yard for which the present invention is provided is illustrated by the single line track diagram at the top of FIG. 1A which is assumed to be constructed on an operator's control panel at a suitable control office. As shown in this diagram, a hump car retarder is provided in the trackway near the hump of the classification yard and all cars pass through this car retarder as they progress toward the several classification tracks. The track layout fans out beyond the hump car retarder into a plurality of group tracks including the group track 10, and each group track has a group car retarder associated therewith and a weighing device or treadle WD at the entrance end of the car retarder. Beyond each group car retarder, the trackway fans out into several classification tracks which may vary in number in accordance with the size of the yard, and although there are generally about eight classification tracks that are fed through each group car retarder, only four classification tracks have been illustrated for this embodiment for the present invention in order to simplify the disclosure. Thus the tracks 1, 2, 3 and 4 are fed from the group track 10, the tracks 1 and 2 being fed through track switches 1TS and 2TS and the tracks 3 and 4 being fed through track switches 1TS and 3TS. The representation of the classification tracks on a track diagram as illustrated at the top of FIG. 1A includes car indicator lamps TK as a means for indicating to an operator the extent of track fullness of the various classification tracks. Although these lamps are illustrated only for the classification tracks associated with one group, it is to be understood that similar lamps are provided for the other groups of the clasification yard. According to the present disclosure, one lamp TK is provided for each car in the classification track, and thus the track is assumed to be full when occupied by 16 cars, as that is the limit of count for the particular car counters that have been illustrated. It is to be understood, however, that it is the usual practice to have the clasification tracks of considerably greater length to hold at least a substantial part of a train, and thus for classification tracks of greater lengths, more indicators are provided, and car counters having greater capacity are employed in accordance with the added capacity required in order to be able to count all of the cars that can be contained in the classification track. It is to be understood that other types of track fullness indicating means could be used in accordance with the requirements of practice, such, for example, as the posting indicator disclosed in the prior U.S. patent application of G. E. Marsh, Ser. No. 580,123, filed April 23, 1956, now U.S. Patent 2,959,773, granted November 8, 1960, or in the Field et al. Patent No. 2,731,632, granted January 17, 1956. One organization employing such an indicator is shown in FIG. 2.

The car retarders may be of any suitable type, such as disclosed, for example, in the U.S. patent to W. K. Howe, No. 1,852,572, dated April 5, 1932. A car retarder of this type is electrically operated to open and closed positions by a Car Retarder Operating Mechanism as is illustrated in block form at the top of FIG. 1B.

It is assumed that each of the group car retarders is automatically operated to closed and open positions to provide the required amount of retardation for each car in accordance with the basic system for automatic control that has been disclosed in the above mentioned prior application of J. H. Auer, Serial No. 578,047, or in the prior U.S. patent application of H. C. Kendall et al., Serial No. 513,364. Inasmuch as reference can be made to the teachings of these prior applications for details relative to the automatic control of each of the group car retarders, it is considered sufficient to illustrate this apparatus by block diagram to simplify the present disclosure, and describe herein only the general mode of operation of this apparatus. According to these prior car retarder control systems, the car retarder is normally maintained in a closed position, and radar speed detection apparatus is provided having a directional antenna DA near the leaving end of the car retarder as a means for continuously reading the speed of a car passing through the car retarder. This speed information is used in combination with a system of computing a desired release speed to automatically open the car retarder when a car it is acting upon has reduced its speed to a computed speed. This radar apparatus comprises a Transmitter and Receiver as illustrated in the block diagram on FIG. 1B, a Discriminator which is governed by a Modifier and car retarder Control Relays that are conditioned by the Discriminator.

A weighing device WD is provided at the entrance end of each of the group car retarders. This device can have a structure as is disclosed, for example, in my prior U.S. patent application Serial No. 386,095, filed October 14, 1953, now U.S. Patent 2,868,534, granted January 13, 1959. A weight detector of this nature is employed as a part of the automatic car retarder control system, but in the present application, the weight detector WD in approach to the group car retarder is used merely to register the pasage of each axle of a car, and thus, as far as the present invention is concerned, a simple wheel operated treadle could as well be employed.

An axle counting means, or car detector, is provided as being operated by the treadle of the weight detector WD, and this apparatus includes the relays LP, BLP, V1, V2 and V3.

A car counter is provided for each of the classification tracks, and although any suitable counting storage mechanism may be employed, the car counter is illustrated as being in the form of a stepping switch having 16 positions. This counter is operated one step for each energizing pulse applied thereto, the actuation of the counter taking place upon termination of each pulse.

Car destination storage and transfer relays B1, B2, TN and TBP are provided for selecting the particular car counter that is to be actuated in response to the registration of the presence of a car by the counting of four axles by the axle counter or car detector. Circuits have not been shown for the control of these relays, as they may be controlled in accordance with systems disclosed, for example, in the prior Brown et al. U.S. Patent No. 2,194,353, issued March 19, 1940, and in the prior U.S. application of N. B. Coley et al., Serial No. 383,432, filed October 1, 1953.

Each group retarder also has associated therewith a binary code relay bank comprising relays DA, DB, DC and DD which are used to select the extent of modification of car release speeds required in accordance with track fullness as detected by the car counter for any one of the classification tracks in the associated group.

Having thus described the general organization of the system provided according to the present invention, detailed consideration of the circuits involved will hereinafter be considered when considering the mode of operation of the system under typical operating conditions.

Operation

Before describing in detail the mode of operation of the modifying means provided in an automatic retarder control system by the present invention, consideration will be given to the general mode of operation of the system upon passage of a car.

The hump car retarder and the group car retarders are normally closed in their braking positions, and each car retarder is automatically opened when a car within the car retarder has reduced its speed to a predetermined speed. The degree of retardation applied is selected in accordance with the weight of each car as determined by the weight detector WD that is disposed in approach to each car retarder. Cars are generally released from the hump car retarder at substantially the same speed, while the release speed for each car in each of the group car retarders is computed in accordance with rollability of the car and other factors, including classification track fullness, and classification track elevation at the point of coupling as will hereafter be considered in detail.

The actuation of the weight detector WD (see FIG. 1B) in approach to each of the group car retarders renders the radar Transmitter-Receiver apparatus effective for the associated car retarder to read the speed of the car. The instant when the car retarder is opened is determined by the associated Discriminator, which in turn is acted upon by a Modifier to modify the car speed at which the car retarder will release in accordance with car performance and track conditions.

To consider how modification is provided in accordance with track fullness, it will be assumed that a car approaches the group car retarder illustrated at the top of FIGS. 1A and 1B at a time when no other cars are present in the classification yard. Under these conditions, the relays are all in their deenergized positions except for the normally energized relay TBP and the relay BLP (see FIG. 1A) which is normally energized by an obvious circuit extending through back contact 20 of relay LP. The stepping switches VS for the different classification tracks have no car counts registered therein according to the normal conditions of the system as illustrated in the drawings.

As a car passes over the weight detector WD, the relay LP is actuated by the pulsing of contact 21 by the respective axles of each of the cars, and each time it is actuated it is maintained in its picked-up position for a short interval sufficient for the count to be registered by reason of its lower winding being shunted across the condenser C1 through front contact 22. The condenser C1 is charged through back contact 22, and thus its charge is effective upon the closure of front contact 22 to energize the lower winding of relay LP for a short time interval. This time interval is made long enough for the relay BLP to become dropped away by reason of the opening of its circuit at back contact 20 of relay LP, and short enough to allow time for relay operations selected by its back contact before another axle is to be counted.

Upon the dropping away of relay BLP in response to the passage of the first axle over the weight detector WD, the relay V1 is picked up by the energization of a circuit extending from (+), including back contact 23 of relay BLP, back contact 24 of relay V2, back contact 25 of relay V3 and lower winding of relay V1, to (−). This relay, when picked up, is maintained energized by a stick circuit extending through back contact 26 of relay V3 and front contact 27 of relay V1, and a second stick circuit is closed for relay V1 upon the picking up of relay BLP as the first pulse is terminated through front contact 23 of relay BLP and front contact 27 of relay V1.

Upon the picking up of relay BLP, with the relay V1 in its picked-up position, relay V2 becomes picked up by the energization of a circuit extending from (+), including front contact 28 of relay V1, back contact 29 of relay V3, upper winding of relay V2 and front contact 30 of relay BLP, to (−). When the second axle is counted, the dropping away of relay BLP closes a stick circuit to maintain relay V2 picked up extending from (+), including back contact 31 of relay BLP, front contact 32 of relay V2 and lower winding of relay V2, to (−). When relay V2 becomes picked up, the closure of its front contact 9 is effective to establish a stick circuit for relay V1.

The dropping away of relay BLP to count the second axle closes a pick-up circuit for relay V3 extending from (+), including back contact 23 of relay BLP, front contact 24 of relay V2, front contact 33 of relay V1, and upper winding of V3, to (−). A stick circuit is provided for relay V3 through front contact 34 of relay V1 and front contact 35 of relay V3. At the termination of the count for the second axle, the relay BLP is restored to its picked-up position and in that position another stick circuit is established for relay V3 extending through front contact 31 of relay BLP and front contact 35 of relay V3. The picking up of relay BLP at this time causes the dropping away of relay V2 by opening its circuit at back contact 31.

When the third axle is counted, the dropping away of relay BLP causes the dropping away of relay V1 by opening its stick circuit at front contact 23. The stick circuit including back contact 26 of relay V3 is open at this time at back contact 26 of relay V3 and at front contact 9 of relay V2. When relay BLP becomes picked up at the end of the third axle count, relay V2 becomes picked up again by the energization of a circuit extending from (+), including back contact 28 of relay V1, front contact 29 of relay V3, upper winding of relay V2 and front contact 30 of relay BLP, to (−). Relay V3 is maintained picked up until this time by a stick circuit including back contact 36 of relay V2 and front contact 35 of relay V3. However, upon the picking up of relay V2, this stick circuit is opened at back contact 36, and relay V3 is maintained energized only until the dropping away of relay BLP upon registration of a count for the fourth axle so as to open front contact 31. With both relays V1 and V3 in their dropped-away positions, relay V2 is maintained picked up only by its stick circuit through back contact 31 of relay BLP, and thus relay V2 becomes dropped away upon the restoration of relay BLP to its picked-up position following the count of the last axle of the car, thus restoring the conditions of the axle counting relays to normal.

After a car has been detected by the counting of the fourth axle, an execution period is established with the relay V2 picked up and the relays V1 and V3 in their dropped away positions providing a pulse for the energization of a selected car counter VS. The selection of the particular car counter to receive the car count is made in accordance with the condition of the automatic switching relays B1 and B2. These are route designation storage relays which can be controlled, for example, according to a circuit organization disclosed in the above mentioned prior Brown et al., Patent No. 2,194,353, issued March 19, 1940.

In providing route description storage in the manner disclosed in that patent, the relay B1 is assumed to be associated with the control of the track switch 1TS, and the relay B2 is associated with the control of the track switches 2TS and 3TS. Each of the relays B is maintained in its dropped away position if its associated track switch is to be in its normal position, and is picked up if its associated track switch is called for to be in its reverse position in order for passage of a car to a classification track destination that has been designated.

The transfer relay TN is required to be picked up to permit transfer of storage into the relays B1 and B2, and this relay is maintained picked up until an exit relay associated with the radar car retarder control apparatus is picked up and is subsequently dropped away when the last car of a cut of cars leaves the car retarder. The control of the transfer relay TN by a stick circuit dependent upon an exit relay associated with the radar car retarder control apparatus is disclosed, for example, in the above mentioned prior U.S. patent application of N. B. Coley et al., Ser. No. 383,432, filed October 1, 1953, but it is preferable that an exit repeater be employed for control of the stick circuit as is shown in FIG. 3. The transfer relay TN is shown in FIG. 3 as having a stick circuit energized through front contact 76 of exit relay XR in multiple wtih back contact 77 of exit repeater relay XRP. The repeater relay XRP is made slow to drop away so that the stick circuit is opened when relay XR drops away after a car leaves the car retarder, but not when a car enters the car retarder.

If the route for a car calls for all the track switches to be in their normal positions, the route is aligned for passage of the car into the classification track 3, and thus the car counter 3VS is actuated in accordance with the detection of the car by the axle counter. Thus, upon the counting of the fourth axle, the winding of the stepping switch 3VS becomes energized by a circuit extending from (+), including front contact 37 of relay V2, back contact 38 of relay V3, back contact 39 of relay V1, front contact 40 of relay TN, back contact 41 of relay B1, back contact 42 of relay B2, and winding of relay 3VS, to (−). This circuit is closed only momentarily, as the relay V2 becomes dropped away as has been described and opens the circuit for stepping switch 3VS at front contact 37. Upon removal of energy from the winding of the stepping switch 3VS, the stepper is actuated for a single step to register a count for the car. Counts for successive cars are made in a similar manner, the stepping switch 3VS being actuated one step for each car detected by the axle counter, provided the car is destined for the associated classification track as determined by the condition of the route storage relays B1 and B2. If the route description calls for the car to enter the classification track 4, the storage relay B2 is in its picked up position, and the closure of front contact 42 selects the stepping switch 4VS to be actuated in response to the car count rather than the stepping switch 3VS. In a similar manner, the contact 43 selects car counters associated with the tracks 1 and 2.

The above description of the axle counter is based on the assumption that all cars to be counted are four axle cars, but for situations in which six axle cars may be involved, a car counter such as is disclosed in the prior U.S. patent application of Vande Sande and Wynn, Serial No. 283,102, filed April 18, 1952, may be employed. The counter disclosed in that application provides means for detecting six axle cars, and such means is used to require a count of six axles, rather than a count of four axles, where six axle cars are involved, before registering a car count. A similar system could be employed in connection with the present invention, wherein six axle counts would be required to register a car count after detection of a six axle car, and four axle counts would be used for registration of a car count for four axle cars.

Each time a car approaches the group car retarder, the Modifier is conditioned in accordance with track fullness of the particular classification track that has been designated to receive the car. This takes place prior to the registration on the car counter for the selected track of the count of the car itself. In other words, the release speed correction in accordance with track fullness is made by the Modifier before the registration of the car count of the car about to enter the car retarder.

In order for track fullness as stored by the car counters to be conditioned to act upon the Modifier, the track fullness for each selected car counter is converted into a binary code by the bank of relays DA, DB, DC and DD, which are provided for the group of classification tracks, and these relays act upon the Modifier to provide the track fullness correction desired. These relays are controlled by respective buses that are connected through suitable half-wave rectifiers to various sections of each of the stepping switch commutators for the stepping switches for the entire group of tracks. This circuit organization provides that the relay DA is subject to energization on single alternate counts of a car counter, relay DB is energized on double alternate counts of the car, relay DC is energized for quadruple alternate counts of the car counter, and relay DD is energized for alternate counts of eight cars.

If there is only one car counted into the car counter 3VS, for example, the relay DA is picked up when the classification track 3 is selected by the storage relays upon the energization of a circuit extending from (+), including front contact 78 of relay TBP, front contact 44 of relay TN, back contact 45 of relay B1, back contact 46 of relay B2, contact 47 of stepping switch 3VS, wire 48, rectifier 49, wire 50, and winding of relay DA, to (−). If the car count stored in the car counter 3VS is three, the relay DB is also energized by a circuit extending from (+), including front contact 78 of relay TBP, front contact 44 of relay TN, back contact 45 of relay B1, back contact 46 of relay B2, contact 51 of relay 3VS, wire 52, rectifier 53, wire 54, and winding of relay DB, to (−). Relay DA is also energized for a third count because of the count being an odd number by reason of application of energy to wire 55. If four cars have been counted by the stepping switch 3VS, the relay DC becomes picked up by the energization of a circuit extending from (+), including front contact 78 of relay TBP, front contact 44 of relay TN, back contact 45 of relay B1, back contact 46 of relay B2, contact 56 of stepping switch 3VS, wire 57, rectifier 58, wire 59, and winding of relay DC, to (−). Because of the count being four, the relays DA and DB are not energized. For a count of eight cars by the stepping switch 3VS, the relay DD is picked up by the energization of a circuit extending from (+), including front contact 78 of relay TBP, front contact 44 of relay TN, back contact 45 of relay B1, back contact 46 of relay B2, contact 60 of relay stepping switch 3VS, wire 61, rectifier 62, wire 63, and winding of relay DD, to (−). The relays DA, DB and DC are in their dropped away positions for this count. It should be readily apparent from the above described typical counts set up by the relays DA, DB, DC and DD that a different combination of the conditions of these relays is established in accordance with each different count stored by any one of the car counters associated with a single group of classification tracks.

The pick-up circuits for the relays D are only momentarily energized upon the picking up of the transfer relay TN. This is because the picking up of relay TN opens the circuit for the energization of relay TBP at back contact 79, and relay TBP in dropping away opens the pick-up circuits for relays D at front contact 78. Relay TBP is made slow to drop away to insure sufficient energizing time for relays D. The application of energy to wire 80 through front contact 81 of relay TN applies stick energy through front contacts 82, 83, 84, and 85 of relays DA, DB, DC, and DD respectively. Thus the relays D, when picked up, are maintained energized until the last car of a cut has left the car retarder. This insures that modification of the release speed is not affected by the counting of cars being acted upon by the group car retarder.

The speed at which the group car retarder is opened is selectively governed to provide modification in accordance with track fullness by the shunting of the resistors 1R, 2R, 4R and 8R by the back contacts 64, 65, 66 and 67 of relays DA, DB, DC and DD respectively. An increase in the resistance applied across wires 294 and 297 (these wire numbers correspond to similar numbered wires in the above mentioned prior application of J. H. Auer, Jr., Ser. No. 578,047, filed April 13, 1956) calls for a decrease in the car leaving speed at which the group car retarder is opened, and thus the resistors R are selectively unshunted to cut in more resistance as the respective classification tracks become filled. If only one car is registered for a classification track selected to a receive a car, only the back contact 64 of relay DA is opened, and thus the resistor 1R is included in the modifying circuit to reduce by a small amount the speed at which the car is to be released from the car retarder. If two cars have been counted into a classification track when a third cut for that track approaches the group car retarder, the relay DB is the only relay that is picked up, and this relay opens its back contact 65 to remove the shunt across the resistor 2R, the other resistors remaining shunted. Because of there being two cars present, it is preferable that the resistor 2R be of substantially twice the resistance of the resistor 1R so that less release speed is selected for the car as it enters the group retarder than when only one car has been mounted into the classification track. A similar condition is found where the classification track car counter registers a count of four cars wherein only the relay DC is picked up to open back contact 66 and unshunt the resistor 4R. This resistor should preferably be substantially four times the resistance of the resistor 1R. If eight cars are registered by a car counter, only the relay DD is picked up, and thus only the resistor 8R is unshunted to provide for the proper release speed for the group car retarder. The resistor 8R is preferably substantially eight times the resistance of the resistor 1R. It will be readily apparent that for other car numbers, different combinations of the relays D are energized at the same time, and thus different combinations of the resistors R are unshunted to add up to different resistances as an analog of track fullness effective to vary inversely the car speed at which the car retarder is opened in accordance with the particular count of cars that is stored in the car counter.

Inasmuch as the different classification tracks have respectively different elevations at various points relative to the elevation of the group car retarder, circuit means is provided for the selection of a plurality of different compensating voltages for the several tracks and for the several tracks and for the several conditions of track fullness on each track as selected by the track fullness relays D to selectively modify the release speed of the group car retarder. A particular classification track for which elevation correction is to be provided is first selected by the route storage relays B1 and B2 in a manner comparable to that which has been described for selecting the proper track for track fullness correction, and then in addition to this selection, a contact fan is provided by contacts of the relays D for each of the four classification tracks that may be selected which in turn determines the amount of voltage compensation fed into the Discriminator for elevation correction for the classification track selected in accordance with the track elevation at the point of fullness.

To consider more specifically the circuit organization provided for elevation correction, it will be noted that the voltage divider VD is connected from (B+) to ground through contact selections of the relays D and the route storage relays B. Thus, when the track 3, for example, is empty, and the manual selector switch 68 is positioned as shown, energy is applied from (B+) to ground through resistors R1, R2, R3, R4, R5 and R6 of the voltage divider VD, manual control switch 68, back contacts 69, 70 and 71 of relays DD, DC, DB and DA respectively, wire 72, back contact 73 of relay B2, back contact 74 of relay B1, front contact 75 of relay TN, and resistor R8, to ground.

In accordance with the energization of the voltage divider VD as described above, a selected voltage is applied to the wire 233 that is an analogue of relative track elevation. This voltage acts on the Discriminator to increase the car release speed comparable to an increase in relative track elevation. This change in voltage results from the selection of different resistances in the section of the voltage divider VD that is below the connection of wire 233, while the resistance of the voltage divider above the connection of wire 233 remains constant.

The manual control switch 68 is merely indicative of a choice of connections, and in actual practice this switch would not be required as once the points of connections on the voltage divider VD have been determined, the connection should never have to be changed.

As car counts are added by the car counter 3VS for track 3, different resistances are selected for an analogue of track elevation on the voltage divider VD. Thus, for example, it has been shown that with 8 cars counted into the track 3, a relatively lower voltage is applied to the Discriminator because of a relatively lower elevation in track 3 at the point of coupling when the track is occupied by 8 cars. This relatively lower voltage is determined by the position of the manual switch 86 and selected by the front contact 69 of relay DD. In a similar manner, other voltages are selected to compensate for other track elevations for the different counts of cars in the respective classification tracks.

It will be noted that there is no selection made by the relay DA for different elevation compensations as it is not considered necessary to change the track elevation correction upon the addition of a single car into the classification track. It is to be understood, however, that circuit selections for track elevation correction can be changed for the addition of a single car if this is required in practice by including contacts of relay DA in the circuit fan for selective connections to the voltage divider VD.

In addition to providing automatic retarder control compensations in accordance with track fullness, it is provided that visual indications are set up on a control panel to keep an operator of the control machine informed as to the condition of track fullness. One system for visual indication of track fullness is illustrated in FIGS. 1A and 1B and another system employing a changeable posting indicator is illustrated in FIG. 2.

In the indication system according to FIGS. 1A and 1B, one bank of connections on each of the car counter stepping switches is employed for the control of individual lamps disposed along the classification tracks in the track diagram, one lamp TK being provided for each car that may occupy the track. In addition, a lamp EK is provided to indicate the condition when a classification track is entirely unoccupied and the associated car counter stepping switch has been reset to its zero position. Thus, for example, the indicator lamp EK in track 4 of the track diagram is illuminated when the associated car counter 4VS is in its zero position by the energization of a circuit extending from (+), including contact 87 of the car counter 1VS, wire 88 and lamp EK, to (−). When a first car is put into the track 4 and is counted by the car counter 4VS, the contact 87 of the car counter 4VS is stepped to its next position, thus opening the circuit just described for the energization of lamp EK and closing a circuit for the energization of lamp 1TK to indicate that one car has been counted into the classification 4 by the car counter 4VS. In a similar manner, the energization of lamps progresses from right to left as the track is filled up in accordance with the stepping of the car counter 4VS. A similar organization is provided for indicating track fullness on each of the other classification tracks.

The manner in which each of the car counters is restored to zero after a classification track has been emptied is of course dependent upon the type of car counters employed. The stepping switches VS as shown in the drawings are assumed to be of a type that will step through an entire revolution. Thus to reset this type of car counter to zero, pulses of energy may be applied to the car counter manually to step it around to the normal position.

To facilitate the resetting of the stepping switches VS, the stepping switches 3VS and 4VS respectively are provided with back contacts 108 and 109 which open upon energization of the associated stepping switches and thus the application of energy steadily to these contacts causes the stepping to be effective as long as energy is thus applied. Reset push buttons 3PB and 4PB are provided for the stepping switch 3VS and 4VS respectively, and the closure of contact 110 of push button 3PB in its depressed position, for example, applies energy through the back contact 108 of stepping switch 3VS to the winding of the stepping switch 3VS so as to progress the stepping as long as the push button 3PB is held in its depressed portion. The operator by watching the indicator lamps TK on the track diagram can maintain the reset button 3PB in its actuated position until the zero indicator lamp EK for the associated classification track becomes illuminated. This reset button can also be used to step the car counter to a position comparable to the position of a car in the classification track where the car for some reason stops short of coupling with other cars in the classification track.

Each car counter VS is, however, prevented from stepping to its zero positions automatically, in case the capacity of the car counter is exceeded, by reason of a circiut closed on the last step of the counter to maintain its winding steadily energized, and thus prevent the advance of the counter to a zero indicating position. This is desirable particularly because the release speed of the group car retarder is determined by the extent of track fullness as indicated by the respective car counters, and if a car counter should be permitted to step to a zero position while the track of the associated track remains full, an erroneous release speed would be provided for the group car retarder, and thus cars would be released at a speed too high for the condition of track fullness that actually prevails.

The stepping switch 3VS (see FIG. 1A), for example, becomes steadily energized when the last step is reached by the energization of a circuit extending from plus (+), including contact 111 of stepping switch 3VS, wire 112, normally closed contact 113 of push button 3PB, resistor 114, and winding of relay 3VS, to minus (−). The resistor 114 limits the current in the circuit as only holding energy for the stepping switch is required, and the normally closed contact 113 of push button 3PB provides a means for opening the circuit just described upon actuation of the reset push button 3PB to permit the resetting of the car counter from its full position upon manual designation.

The system for indicating track fullness employing a single posting indicator as is illustrated in FIG. 2, employs a posting indicator as heretofore described that can be controlled by a binary code that is read off of the relays DA1, DB1, DC1, and DD1. These relays are controlled similar to the manner that has been described in detail for the control of the bank of relays D shown in FIG. 1B, except for some modified means of control that will be hereafter described to render these relays subject to either control in accordance with the selection of a classification track by the route description storage or in accordance with manual control as selected by the automatic-manual switch A-M. The relays DA1, DB1, DC1 and DD1 are made slightly slow in dropping away by the shunting of their windings by resistors 89 so that these relays will be held up upon the shifting of the contact 90 of relay TBP in shifting energization from the pick-up windings to the stick windings of the relays.

It will be readily apparent that with the lever A-M in the A position, the control of the relays DA1, DB1, DC1 and DD1 is the same as has been heretofore described for the control of corresponding relays DA, DB, DC and DD of FIG. 1B. The selections on the car counter stepping switches for the control of this bank of relays is illustrated in FIG. 2 by block diagram for the purpose of simplification of the drawings. It is to be understood that the car counter contact selections shown by block diagram in FIG. 2 are provided comparable to selections disclosed in detail in FIGS. 1A and 1B for corresponding car counters. Thus, with the switch A-M in its left-hand position, the operation of the relays D of FIG. 2 is comparable to the operation of the relays D of FIG. 1B, and the contacts 91, 92, 93 and 94 of relays DA1, DB1, DC1 and DD1 respectively apply energy to the code control wires 95, 96, 97 and 98 respectively of the Posting Indicator. Thus the number set up in the posting indicator, with the switch A-M in its left-hand position, is always in accordance with the description of the destination of a car which may be approaching or within the group car retarder. After the car has left the group car retarder, the storage of the route description is cancelled as has been described, and the bank of relays D becomes deenergized. At this time the lamp 99 within the posting indicator is extinguished. This lamp is energized through either of front contacts 100, 101, 102 and 103 of relays DA1, DB1, DC1 and DD1 respectively which are connected in multiple.

When the operator wishes to know how many cars have been counted into one of the classification tracks of the group, other than the track that was last selected for passage of a car, he may call for an indication by the posting indicator of track fullness in any track that he may designate by the actuation of the switch A-M to a corresponding track number position. Before actuating this lever, however, he should check to see that the lamp 146 which is energized through front contact 105 of the transfer relay TN is dark. If this lamp is illuminated, it is indicated that the bank of relay D have been actuated in accordance with a storage by the relays B1 and B2, and thus these relays cannot be manually changed at this time because this would have an effect upon the control of the car retarder. Thus, when the lamp 146 is dark, the operator can actuate the switch A-M to read track fullness in any classification track he wishes to select, the actuation of the switch A-M being effective to apply energy selectively through switch contact 106 and through contact selections of the particular car counter belonging to the classification track that has been designated by the actuation of a switch A-M. Energy is fed to contact 106 under these conditions through front contact 90 of relay TBP and back contact 107 of relay TN to check that there is no storage set up for a car approaching or within the group car retarder. It is thus provided that in accordance with the position of the switch A-M, the binary code relays D of FIG. 2 are conditioned to correspond with the car count for the track that has been designated, and thus the posting indicator becomes positioned in accordance with that car count, and the lamp 99 in the indicator becomes energized.

In case route description for a car should be received by the relays B1 and B2 while the switch A-M is operated to a position other than the automatic position, the manual control of the relays DA1, DB1, DC1 and DD1 is interrupted by the picking up of relay TN at back contact 107, and thus these relays are immediately conditioned in accordance with their positions required for the particular classification track that is designated by the storage set up in the condition of the relays B1 and B2. By reason of selecting the stick energy for the relays DA1, DB1, DC1 and DD1 through back contact 90 of relay TBP, it is provided that, by reason of the slow dropaway characteristics of the relay TBP, the relays DA1, DB1, DC1 and DD1 that have been energized by manual control and are not required to be energized for the automatic control are deenergized for a sufficient time interval before the establishment of the stick circuits for these relays to permit them to be dropped away. Relay TBP is dropped away upon receiving the description, and thus the closure of its back contact establishes stick circuits for the relays DA1, DB1, DC1 and DD1 that have been conditioned in accordance with the new description that has been received. The picking up of relay TN when the new description is received energizes the lamp 146 to indicate to the operator that he should restore the lever A-M to its automatic position and that the posting indicator has been changed to indicate the track fullness of the track that is to receive the car which is approaching the group car retarder.

Having thus described a car retarder control system as applied to a simple portion of a classification yard, it is to be understood that various adaptations, alterations and modifications may be made to the specific form shown as required in practice to adapt the system to varying requirements as to different classification yard track layouts and as to other matters of system design as may be required in practice.

What I claim is:

1. An automatic car retarder control system for classification yards comprising:
   (a) a car retarder in a stretch of track feeding a group of classification tracks,
   (b) said retarder being power operable from a breaking position to a released position,
   (c) means including apparatus registering car speed within the retarder for operating said car retarder to said released position when a car within the retarder has reduced its speed to a selected release speed,
   (d) a car counting register for each of the classification tracks,
   (e) a bank of track fullness relays for said group of classification tracks,
   (f) circuit means for selectively energizing said track fullness relays according to a binary system of counting corresponding to the number of cars counted into any selected one of said counting registers, and
   (g) circuit means for selectively modifying the car release speed for said car retarder in accordance with a binary count that is set up in said bank of track fullness relays,
   (h) said circuit means including in series a resistor for each of the relays of the bank, and said circuit means including a contact of each relay for shunting said resistor associated with that relay.
   (i) said resistors having relative progressive binary values which are different multiples of the value of a first resistor in the progression.

2. An automatic car retarder control system according to claim 1 wherein the car counting register for each of the classification tracks is a stepping switch.

3. An automatic car retarder control system according to claim 1 wherein a posting indicator is provided for the group of classification tracks, and circuit means is provided to actuate the indicator in accordance with selections by said bank of relays.

4. An automatic car retarder control system according to claim 1 wherein circuit means is provided for further modifying the car release speed in accordance with track elevation.

References Cited in the file of this patent
UNITED STATES PATENTS

| | | |
|---|---|---|
| 1,586,989 | Haines | June 1, 1926 |
| 2,045,201 | Rabourdin | June 23, 1936 |
| 2,539,014 | Frantz | Jan. 23, 1951 |
| 2,658,139 | Abate | Nov. 3, 1953 |
| 2,693,593 | Crosman | Nov. 2, 1954 |
| 2,700,728 | Brixner | Jan. 25, 1955 |
| 2,727,138 | Agnew | Dec. 13, 1955 |
| 2,731,632 | Field | Jan. 17, 1956 |
| 2,806,685 | Vande Sande | Sept. 17, 1957 |
| 2,899,544 | Marquardt | Aug. 11, 1959 |

FOREIGN PATENTS

| | | |
|---|---|---|
| 756,499 | Great Britain | Sept. 5, 1956 |

OTHER REFERENCES

Pulse and Digital Circuits, by Millman and Taub, McGraw-Hill Book Publishing Co., 1956, pages 325 and 326. Copy in Div. 34.